(12) United States Patent
Kinlaw

(10) Patent No.: US 12,533,436 B2
(45) Date of Patent: Jan. 27, 2026

(54) DISINFECTING AND/OR STERILIZING DEVICE FOR DOOR HANDLES

(71) Applicant: Roshell Kinlaw, Sanford, NC (US)

(72) Inventor: Roshell Kinlaw, Sanford, NC (US)

( * ) Notice: Subject to any disclaimer, the term of this patent is extended or adjusted under 35 U.S.C. 154(b) by 796 days.

(21) Appl. No.: 17/742,074

(22) Filed: May 11, 2022

(65) Prior Publication Data

US 2022/0362424 A1 Nov. 17, 2022

Related U.S. Application Data

(60) Provisional application No. 63/186,902, filed on May 11, 2021.

(51) Int. Cl.
*A61L 2/00* (2006.01)
*A61L 2/22* (2006.01)
*A61L 9/00* (2006.01)
*B06B 1/00* (2006.01)

(52) U.S. Cl.
CPC ............. *A61L 2/22* (2013.01); *A61L 2202/14* (2013.01); *A61L 2202/15* (2013.01)

(58) Field of Classification Search
CPC .... B05B 17/0607; A61L 2/22; A61L 2202/15; A61L 2202/14
USPC .................. 422/5, 28, 127–128, 292, 305
See application file for complete search history.

(56) References Cited

U.S. PATENT DOCUMENTS 9,358,569 B2 * 6/2016 Burt .................... B05B 17/0615

* cited by examiner

*Primary Examiner* — Monzer R Chorbaji
(74) *Attorney, Agent, or Firm* — Ashley D. Johnson; Dogwood Patent and Trademark Law

(57) ABSTRACT

The presently disclosed subject matter is directed to a device capable of disinfecting and/or sterilizing a door handle. Specifically, the disclosed device fits around commonly used doorknobs or door handles. The device includes an interior compartment that houses one or more solutions capable of killing or neutralizing microbial organisms present on the door handle and surrounding area. Particularly, the solution is sprayed from the interior compartment through one or more outlets positioned adjacent to the door handle. In this way, the door handle remains disinfected and/or sterilized between uses to prevent the spread of harmful viruses, bacteria, and other microbes

18 Claims, 14 Drawing Sheets

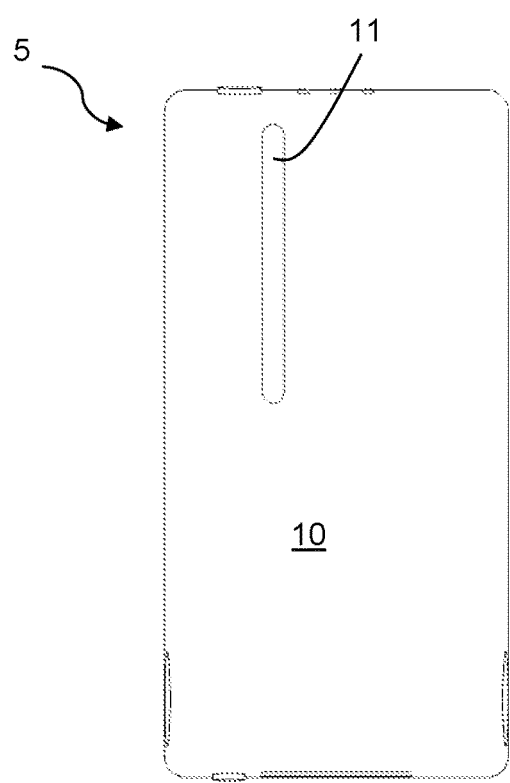 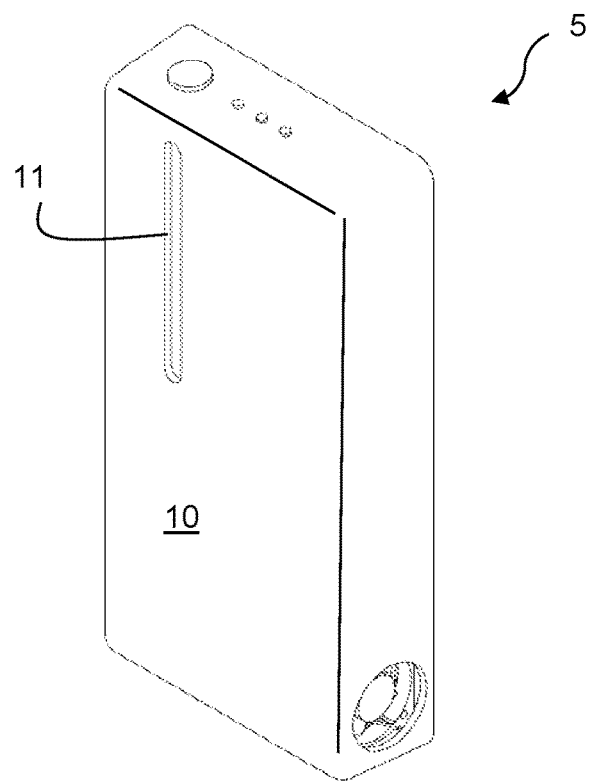
Fig. 3aFig. 3b

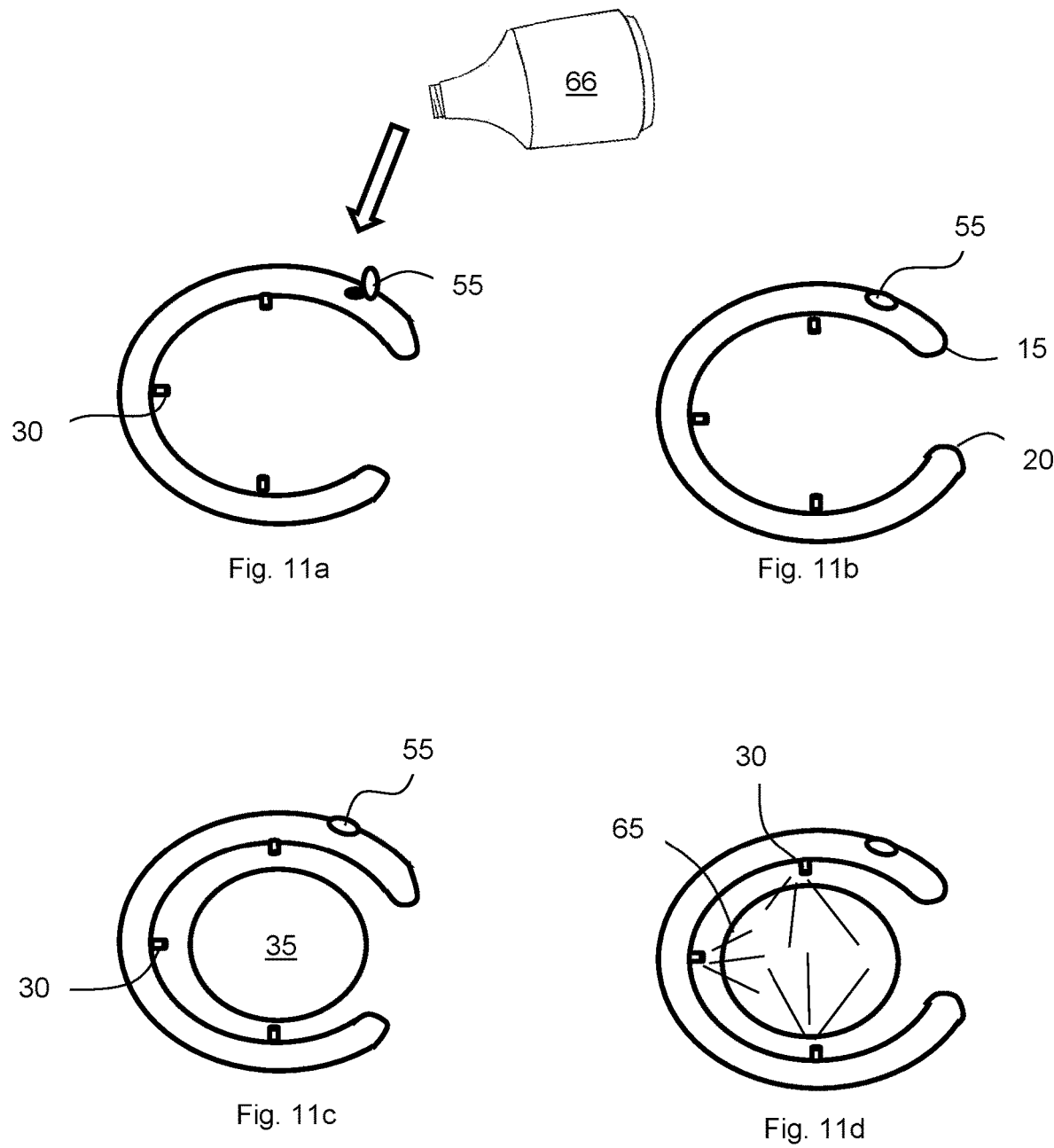

DISINFECTING AND/OR STERILIZING DEVICE FOR DOOR HANDLES

CROSS-REFERENCE TO RELATED APPLICATIONS

This application claims priority to U.S. Provisional Patent Application No. 63/186,902, filed May 11, 2021, the entire content of which is hereby incorporated by reference.

TECHNICAL FIELD

The presently disclosed subject matter is generally directed to a device positioned at least partially around or adjacent to a door handle. The device is configured to disinfect and/or sterilize the door handle and surrounding area to prevent the transmission of harmful microorganisms.

BACKGROUND

In most buildings, entry into and exit out of the various rooms is achieved with the opening and closing of doors. The doors typically include a doorknob, door handle, or other device that unlatches the door structure from a door jamb or frame. Doorknobs and door handles are typically contacted with bare hands, which can easily spread harmful viruses and bacteria to other facility users. For example, the influenza and COVID-19 viruses are carried on doorknobs and door handles and can enter the body when infected hands also touch a user's nose or mouth. According to the U.S. Center for Disease control, the influenza virus hospitalizes more than 200,000 people a year, and approximately 36,000 die from influenza related infections. Further, there have been over 500,000 deaths in the United States from COVID-19 infection and related complications since 2020. Thus, maintaining a clean and sanitary door handle is an ongoing challenge. Traditional cleaning solutions are available for treating doorknobs and push plates, but must be applied between each user and are therefore not practical. Some people carry gloves or paper towels to cover the door handle, but these options are burdensome and not efficient. It would therefore be beneficial to provide a device and methods to help reduce exposure to door handles that are infected with harmful bacteria, viruses, and other potentially dangerous microbes.

SUMMARY

In some embodiments, the presently disclosed subject matter is directed to a sterilizing or disinfecting dispenser comprising: a housing defined by an interior compartment and a plurality of openings that span the interior compartment; one or more sensors; an ultrasonic transducer positioned within the interior compartment; a plurality of fans positioned within the interior compartment, wherein each fan is positioned adjacent to a housing opening; a pump operably connected to the interior compartment and the ultrasonic transducer; a microcontroller; one or more outlets in fluid communication with the interior compartment; a series of interior passages that connect the one or more outlets and an interior area adjacent to the fans; wherein the fans are activated by the microcontroller, moving air past the ultrasonic transducer and out of the outlets.

In some embodiments, a disinfecting or sterilizing solution is housed within the interior compartment.

In some embodiments, the disinfecting or sterilizing solution is selected from hydrogen peroxide, chlorine bleach, alcohol, acid, or combinations thereof.

In some embodiments, the one or more outlets are selected from one or more sprayers, openings, ports, nozzles, or combinations thereof.

In some embodiments, the device further includes a port that provides access to the interior compartment of the housing.

In some embodiments, the one or more sensors that trigger when a user approaches the device.

In some embodiments, the device includes a manual reset that triggers activation of the one or more outlets.

In some embodiments, the presently disclosed subject matter is directed to a method of disinfecting or sterilizing a door handle, the method comprising: positioning a dispenser adjacent to an exterior surface of the door handle, the dispenser defined as: a housing defined by an interior compartment and a plurality of openings that span the interior compartment; one or more sensors; an ultrasonic transducer positioned within the interior compartment; a plurality of fans positioned within the interior compartment, wherein each fan is positioned adjacent to a housing opening; a pump operably connected to the interior compartment and the ultrasonic transducer; a microcontroller; one or more outlets in fluid communication with the interior compartment; a series of interior passages that connect the one or more outlets and an interior area adjacent to the fans; wherein the fans are activated by the microcontroller, moving air past the ultrasonic transducer and out of the outlets; activating the one or more outlets to dispense the disinfecting or sterilizing solution from the interior compartment to contact the door handle after the occurrence of a predetermined event; whereby the door handle is disinfected or sterilized.

In some embodiments, the disinfecting or sterilizing solution is sprayed from the outlets for about 5-30 seconds.

In some embodiments, microorganisms present on the door handle are inactivated or killed.

In some embodiments, the microorganisms are selected from bacteria, viruses, molds, or combinations thereof.

In some embodiments, the microorganisms are selected from influenza or COVID-19 viruses.

In some embodiments, the activating occurs at a given time interval.

In some embodiments, the activating occurs in response to manipulation of the door handle.

In some embodiments, the activating occurs in response to input from one or more sensors positioned on the device housing.

In some embodiments, the sensors are selected from motion sensors, temperature sensors, noise sensors, or heat sensors.

In some embodiments, the device includes a controller that provides maintenance spray from the outlets at a pre-set time interval.

In some embodiments, the activating is in response to a manual reset by a user.

In some embodiments, the disinfecting or sterilizing solution is selected from hydrogen peroxide, chlorine bleach, alcohol, acid, or combinations thereof.

BRIEF DESCRIPTION OF THE DRAWINGS

FIG. 3a is a front plan view of a disinfecting or sanitizing device in accordance with some embodiments of the presently disclosed subject matter.

FIG. 3b is a perspective view of the device of FIG. 3a.

FIGS. 11a and 11b are front plan views of a method of filling the interior compartment of a device housing with solution in accordance with some embodiments of the presently disclosed subject matter.

FIG. 11c is a front plan view of a device positioned about a door handle in accordance with some embodiments of the presently disclosed subject matter.

FIG. 11d is a front plan view of a device actively dispensing disinfecting and/or sterilizing solution onto a corresponding door handle in accordance with some embodiments of the presently disclosed subject matter.

DETAILED DESCRIPTION

Figure 1:
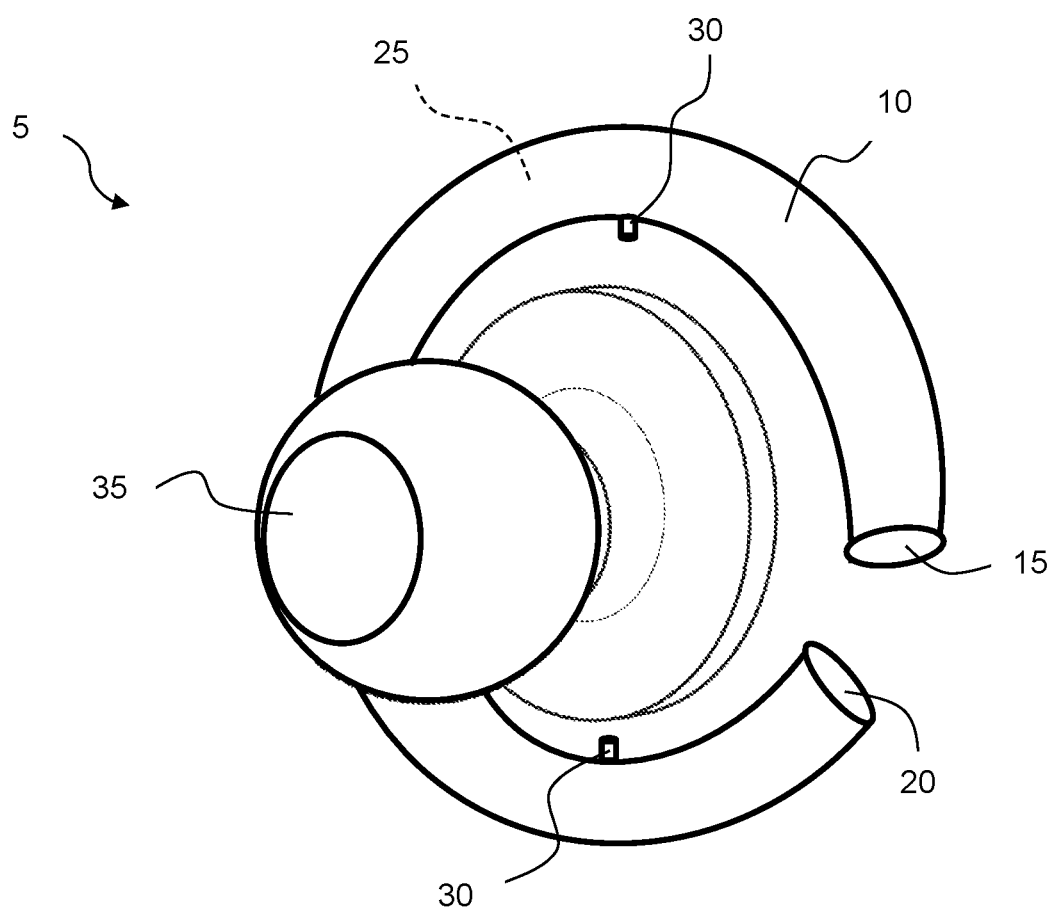
FIG. 1 is a perspective view of a door handle comprising a sterilizing and/or disinfecting device in accordance with some embodiments of the presently disclosed subject matter.

The presently disclosed subject matter is introduced with sufficient details to provide an understanding of one or more particular embodiments of broader inventive subject matters. The descriptions expound upon and exemplify features of those embodiments without limiting the inventive subject matters to the explicitly described embodiments and features. Considerations in view of these descriptions will likely give rise to additional and similar embodiments and features without departing from the scope of the presently disclosed subject matter.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "a device" can include a plurality of such devices, and so forth. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−0.1%, from the specified amount, as such variations are appropriate in the disclosed packages and methods.

As used herein, the term "and/or" includes any and all combinations of one or more of the associated listed items.

Relative terms such as "below" or "above" or "upper" or "lower" or "horizontal" or "vertical" may be used herein to describe a relationship of one element, layer, or region to another element, layer, or region as illustrated in the drawing figures. It will be understood that these terms and those discussed above are intended to encompass different orientations of the device in addition to the orientation depicted in the drawing figures.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The presently disclosed subject matter is generally directed to a device capable of disinfecting and/or sterilizing a door handle. Specifically, the disclosed device fits around and/or sprays onto commonly used doorknobs or door handles, as illustrated in FIG. 1. Device 5 includes housing 10 comprising first end 15 and second end 20. The device includes interior compartment 25 that houses one or more solutions capable of killing or neutralizing microbial organisms present on the door handle and surrounding area. As described in more detail herein below, the solution is sprayed from interior compartment 25 through one or more outlets 30 positioned adjacent to handle 35. In this way, the door handle remains disinfected and/or sterilized between uses to prevent the spread of harmful viruses, bacteria, and other microbes.

The term "disinfect" or "disinfecting" as used herein refers to the removal, inhibition, neutralization, and/or killing of microbial organisms on a surface. The term "sterilize" or "sterilizing" as used herein refers to the killing of all microbial organisms on a surface. It should be appreciated that the while the terms "sterilize" and "disinfect" have different scientific meanings, they are used interchangeably herein, as actual results of the presently disclosed subject matter can differ according to the nature of the targeted microorganism, the product being processed, and/or the methods used.

Figure 2A:
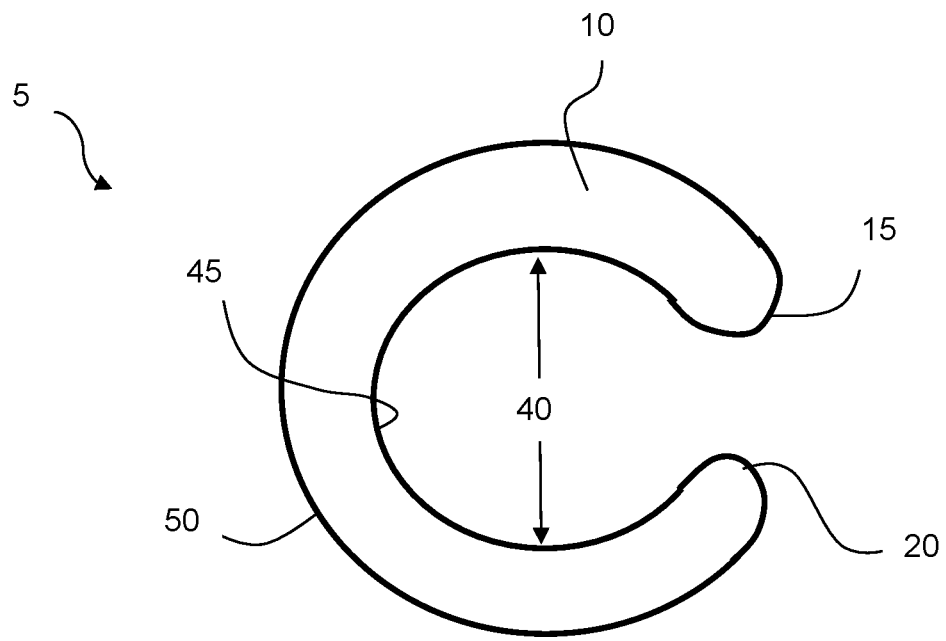
FIG. 2a is a front plan view of a device housing in accordance with some embodiments of the presently disclosed subject matter.
Figure 2B:
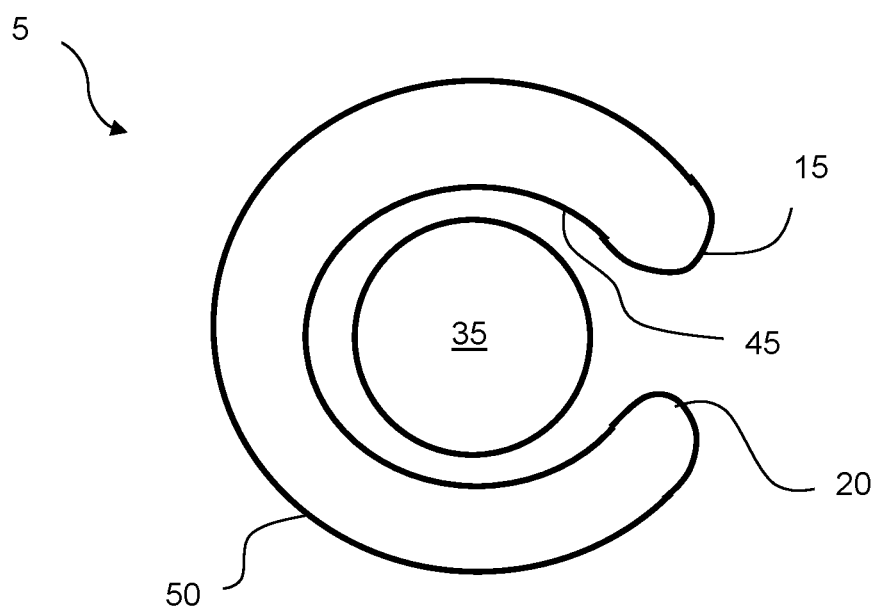
FIG. 2b is a front plant view of a device housing configured on a door handle in accordance with some embodiments of the presently disclosed subject matter.

As set forth above, the disclosed disinfecting device includes first end 15, second end 20, and hollow housing 10, as shown in FIG. 2a. Device 5 comprises central opening 40 between first and second ends 15, 20 that is sized to accept a corresponding door handle. In some embodiments, opening 40 can span a distance of about 3-6 inches (e.g., at least/no more than about 3, 3.5, 4, 4.5, 5, 5.5, or 6 inches). The device further includes inner edge 45 and opposed outer edge 50. The inner edge is proximal to the outer edge of the door handle base that is fixed to the door, as shown in FIG. 2b.

FIGS. 3a and 3b illustrate an embodiment of device 5 comprising rectangular housing 10. As shown, the housing can include window 11 that provides the user with a determination of the level of disinfecting and/or sanitizing solution remaining within the device internal compartment 25. The window can be constructed from any transparent or semi-transparent material, allowing the user a visible determination of when the level of disinfecting/sanitizing solution is running low, needs to be refilled, etc.

Figure 4:
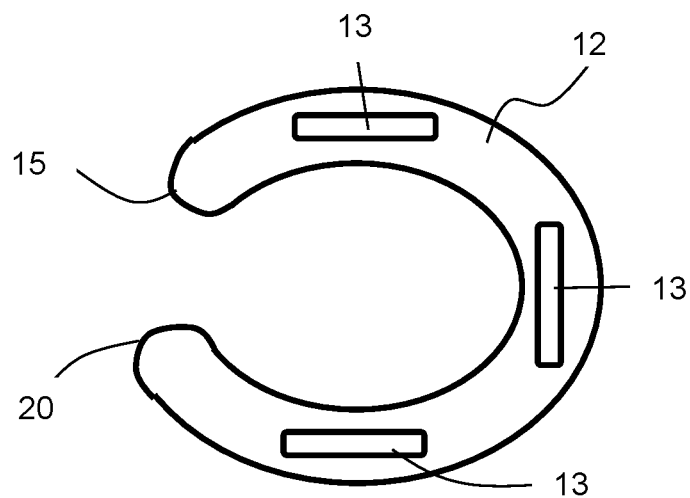
FIG. 4 is a top plan view of the rear face of a device housing in accordance with some embodiments of the presently disclosed subject matter.

The device also includes rear face 12 that faces and contacts a supporting door, as shown in FIG. 4. The rear face of the device can include on or more attachments 13 that allow the device to remain in position around door handle 35. For example, the attachments can include one or more adhesive strips in some embodiments. Thus, the housing can be mounted to a surface using conventional materials, such as adhesive, molding, screws, magnets, fasteners, and the like. In some embodiments, the housing can fit into a mounting plate that is fastened to the door using magnets, adhesive, screws, fasteners, and the like.

The housing is defined by interior compartment 25 that stores a volume of sterilizing or disinfecting solution. The term "sterilizing solution" refers to any solution that can sterilize door handle 35. The term "disinfecting solution" refers to any solution that can disinfect the door handle. For example, the sterilizing/disinfecting solution can include (but is not limited to) hydrogen peroxide, chlorine bleach, alcohol, acid, or combinations thereof. In some embodiments, the solution can include a bactericide and/or a virucide (i.e., an agent active against bacterial or viral infections), such as Triclosan®, Lysol®, and/or aqueous hypochlorite solutions. The disinfecting/sterilizing solution can be mixable with a liquid diluent (such as water, buffer, and the like) such that the resulting mixture can be aerosolized. Moreover, the diluent can be volatile at room temperature such that after the mixture settles on the door handle, the diluent can evaporate leaving a dry-to-touch surface.

Optionally, a scent additive can be included in the disinfecting and/or sterilizing solution to function as an air freshener.

Interior compartment 25 holds a predetermined volume of sanitizing or disinfecting solution. In some embodiments, the volume of the compartment is about 1-500 mL (e.g., at least/no more than about 1, 5, 10, 25, 50, 75, 100, 125, 150, 175, 200, 225, 250, 275, 300, 325, 350, 375, 400, 425, 450, 475, or 500 mL). The reservoir can be configured in any shape, so long as it fits within the interior of the housing.

Figure 5A:
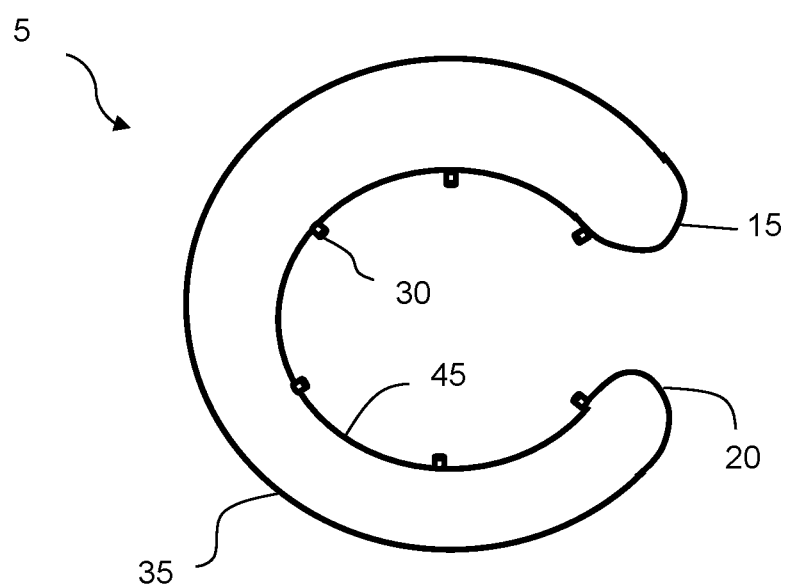
FIG. 5a is a front plan view of a device housing comprising a plurality of dispensing outlets in accordance with some embodiments of the presently disclosed subject matter.
Figure 5B:
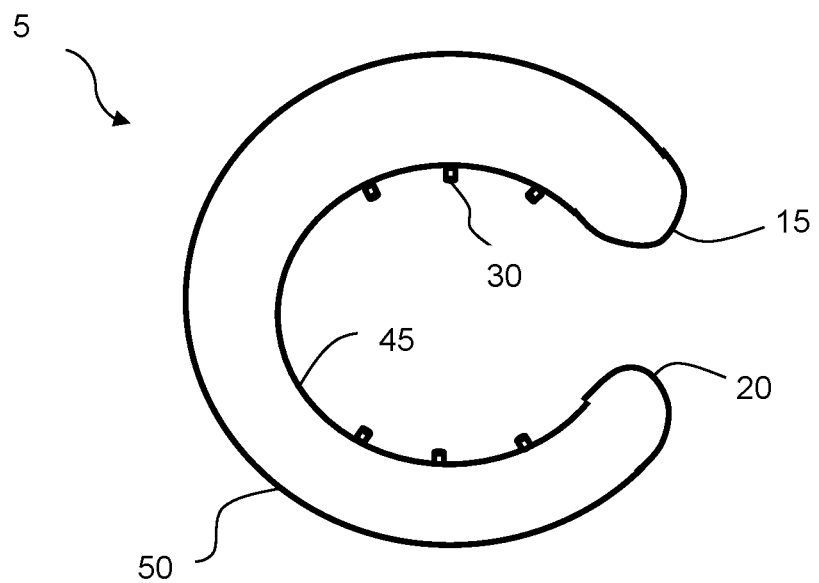
FIG. 5b is a front plan view of a device housing comprising a plurality of clustered dispensing outlets in accordance with some embodiments of the presently disclosed subject matter.

In some embodiments, one or more housing edges 45 comprise one or more outlets 30 in fluid communication with the interior compartment, as shown in FIG. 5a. In this way, the solution housed within the interior compartment can be dispensed as described below. The term "outlet" broadly refers to any element that allows distributing of the sterilizing or disinfecting solution from the interior compartment of the housing. For example, outlets 30 can be configured as one or more sprayers, openings, ports, nozzles, and like. In some embodiments, the outlets are evenly dispersed around inner edge 45 as shown in FIG. 5a. However, the presently disclosed subject matter also includes embodiments wherein the outlets are clustered to focus on the main points of user contact, as shown in the embodiment of FIG. 5b. Advantageously, the outlets are dispersed about the housing to direct the spray of the disinfecting or sterilizing solution toward the handle from different directions to increase the surface contact of the solution. It should be appreciated that one or more outlets can be positioned on any surface of the device, such as a lower edge.

Figure 5C:
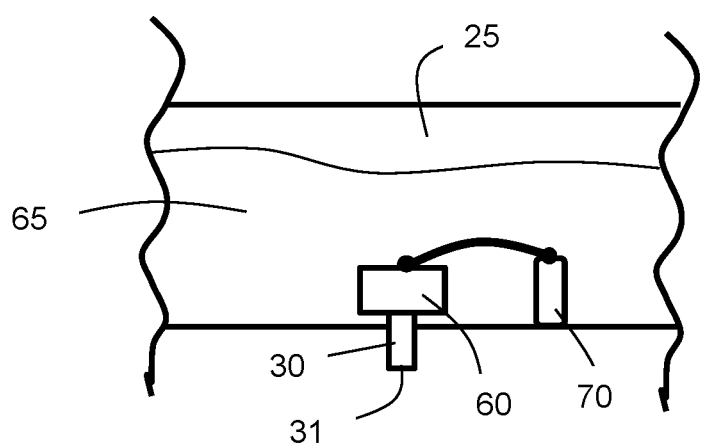
FIG. 5c is a fragmentary view illustrating an outlet pump and power source in accordance with some embodiments of the presently disclosed subject matter.

Device 5 can dispense the disinfecting/sanitizing solution from outlets 30 using any conventional mechanism. For example, the housing can include pump 60 operably connected to each outlet that serves to dispense the solution from the outlet exit end 31, as illustrated in the embodiment of FIG. 5c. It should be appreciated that the term "pump" can refer to any element that functions to move solution 65 from the interior of the housing through the outlet to the external environment (e.g., to contact a corresponding door handle). Suitable pumps can therefore include (but are not limited to) peristaltic pumps, gear pump, roller pump, rotary pump, reciprocating pump, diaphragm pump, or combinations thereof.

Figure 6A:
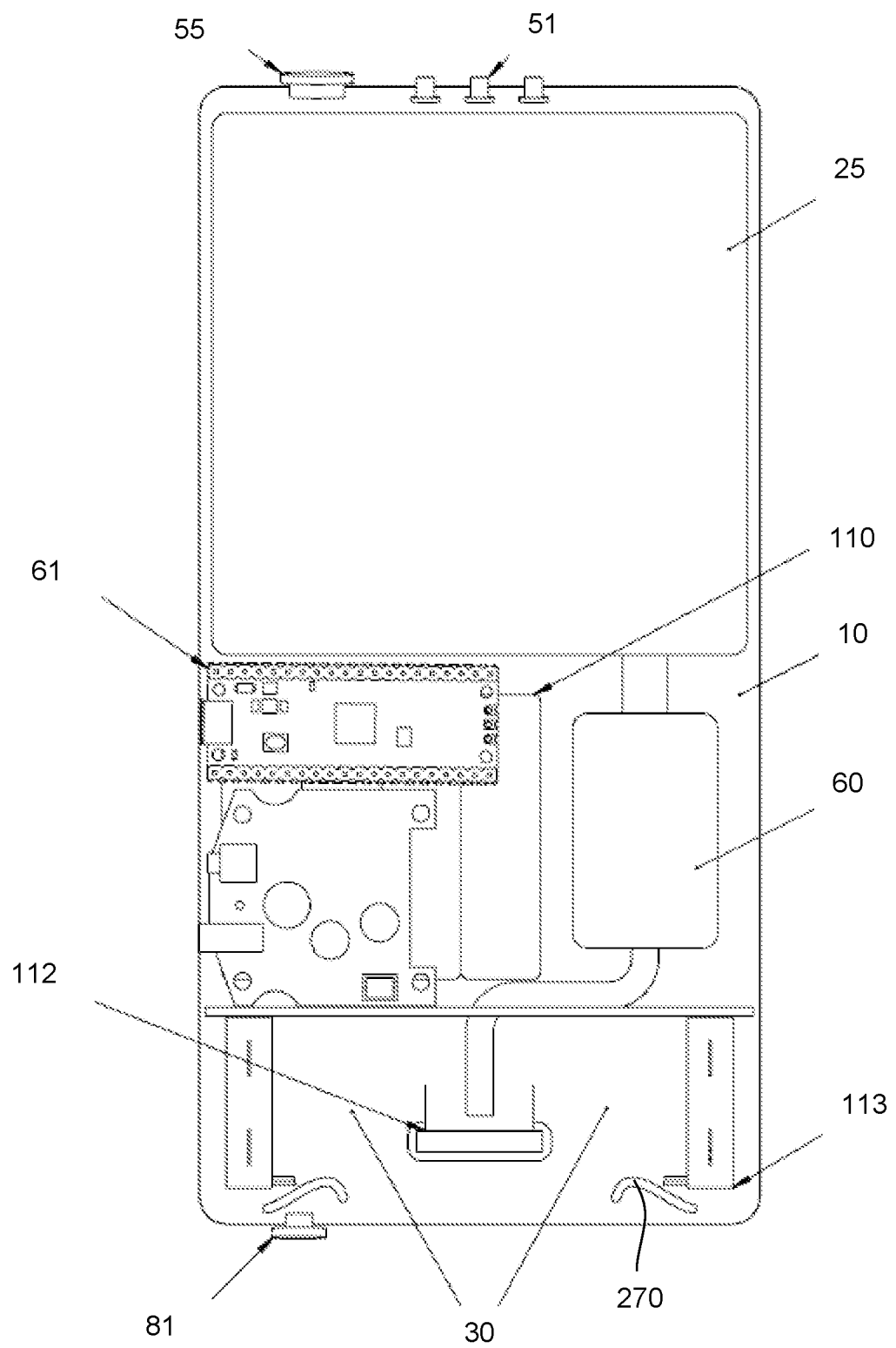
FIG. 6a is a front plan view of a disinfecting or sanitizing device in accordance with some embodiments of the presently disclosed subject matter.
Figure 6B:
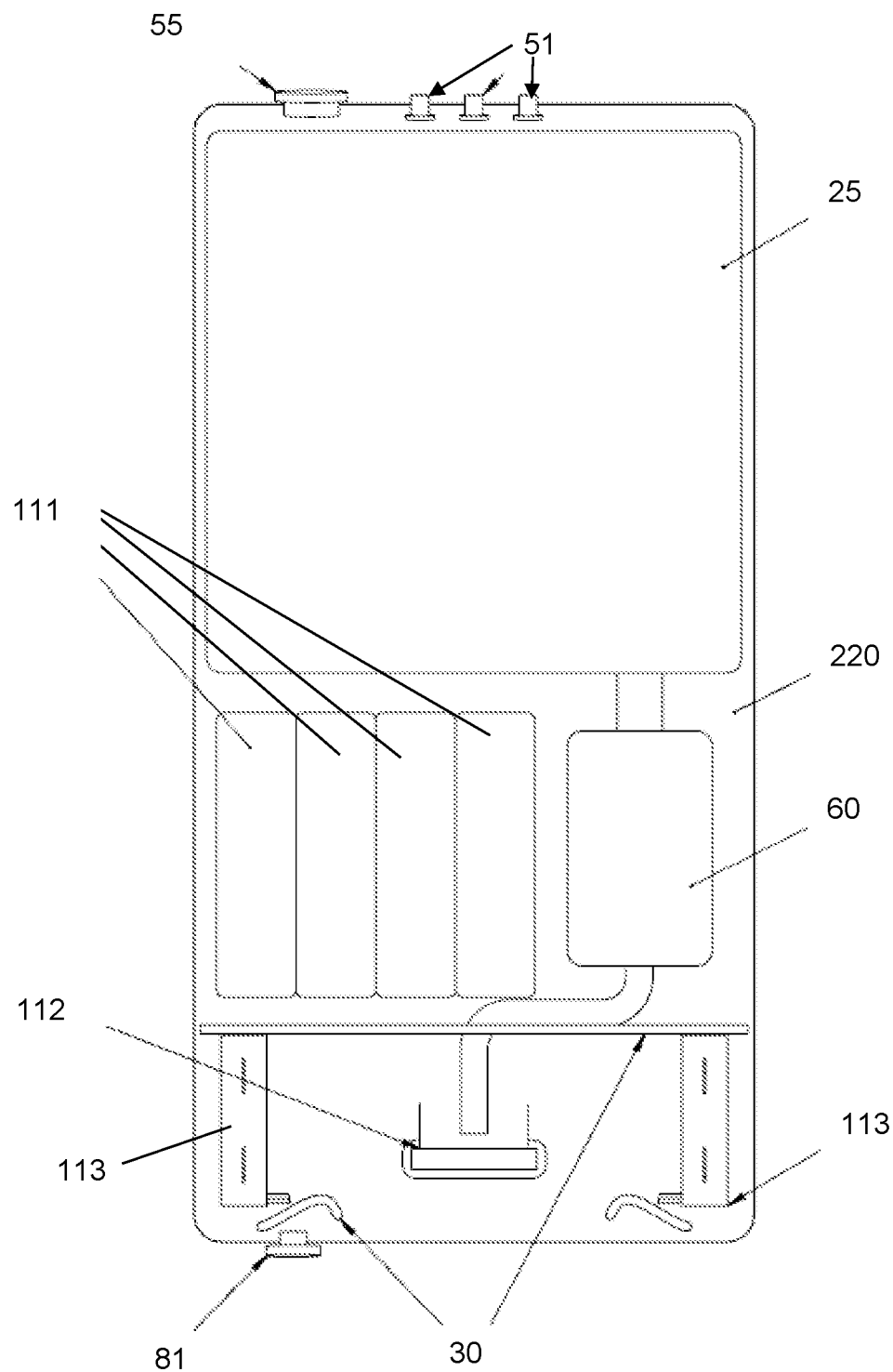
FIG. 6b is a front plan view of a disinfecting or sanitizing device with a plurality of batteries in accordance with some embodiments of the presently disclosed subject matter.
Figure 6C:
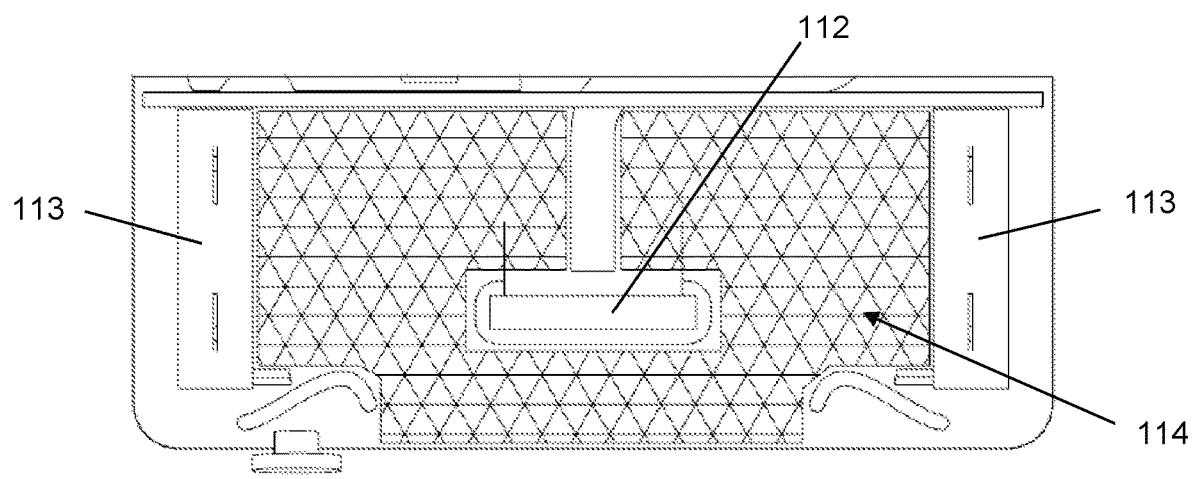
FIG. 6c is a fragmentary view of a disinfecting or sanitizing device comprising a network of apertures in accordance with some embodiments of the presently disclosed subject matter.
Figure 6D:
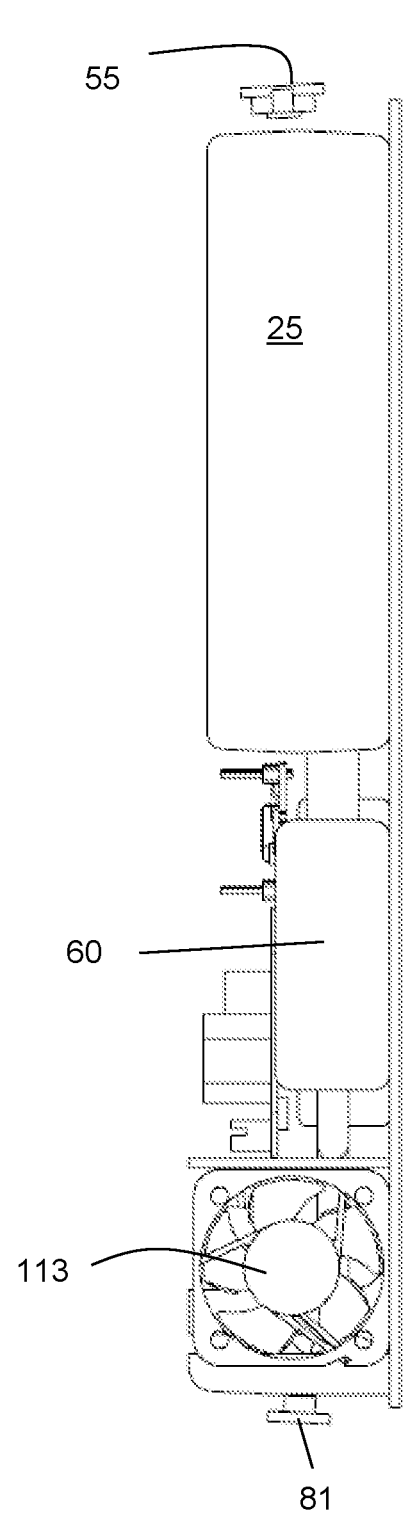
FIG. 6d is a side plan view of a disinfecting or sanitizing device with the housing removed in accordance with some embodiments of the presently disclosed subject matter.
Figure 6E:
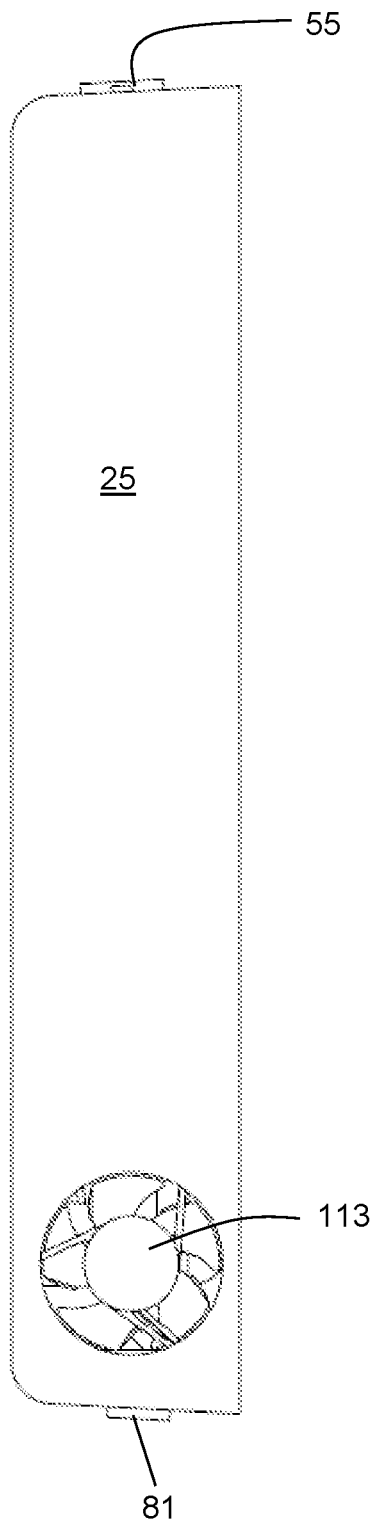
FIG. 6e is a side plan view of a disinfecting or sanitizing device in accordance with some embodiments of the presently disclosed subject matter.
Figure 7:
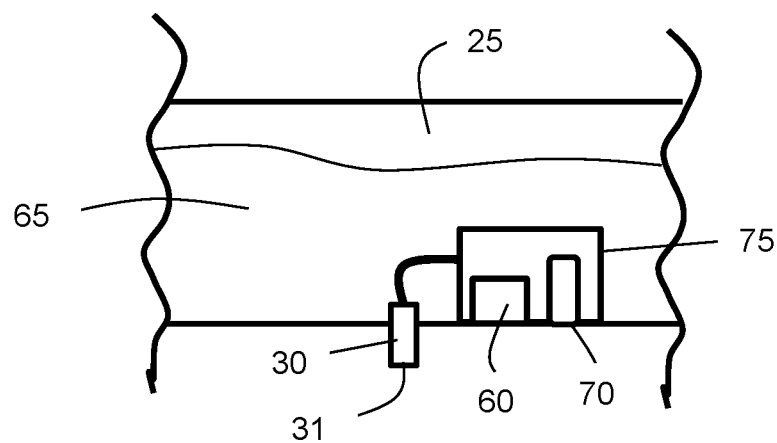
FIG. 7 is a fragmentary view of a dispensing device comprising an outlet and an interior compartment in accordance with some embodiments of the presently disclosed subject matter.
Figure 8:
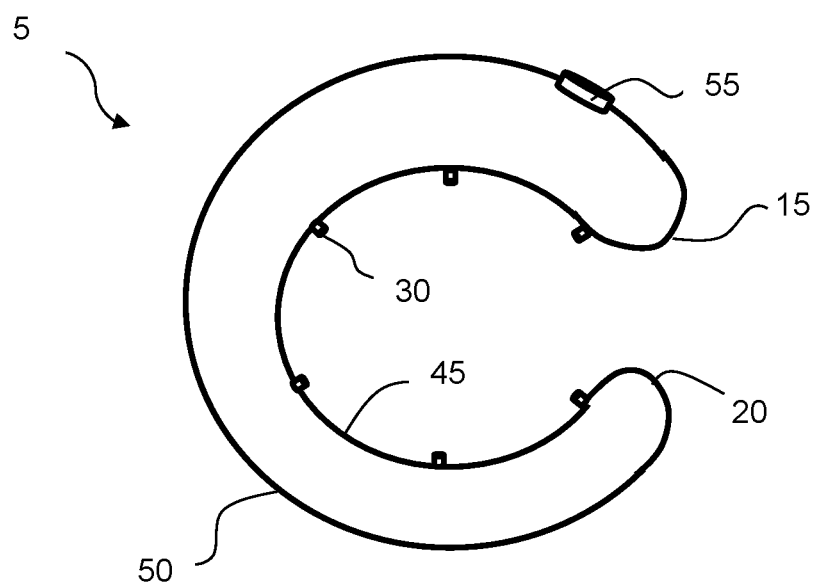
FIG. 8 is a front plan view of a device housing comprising a refill port in accordance with some embodiments of the presently disclosed subject matter.
Figure 9:
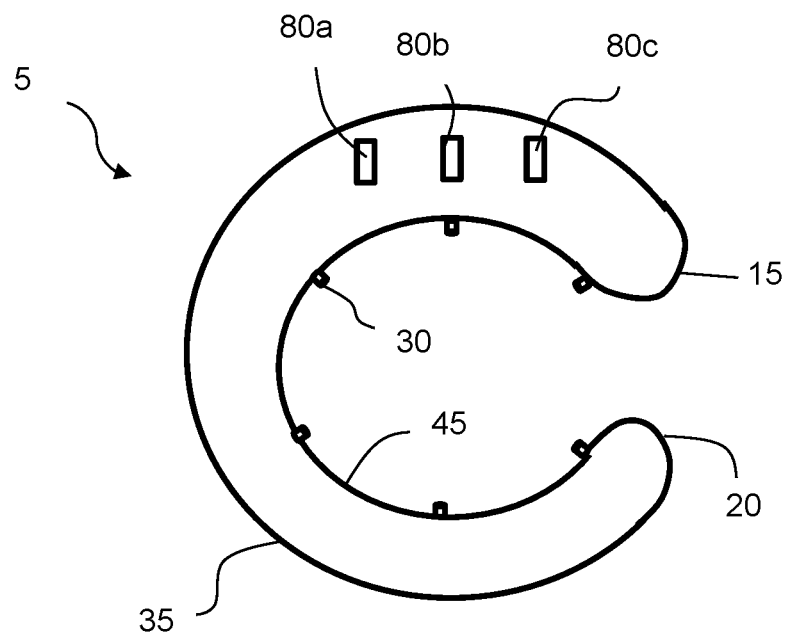
FIG. 9 is a front plan view of a device housing comprising a series of indicators in accordance with some embodiments of the presently disclosed subject matter.
Figure 10:
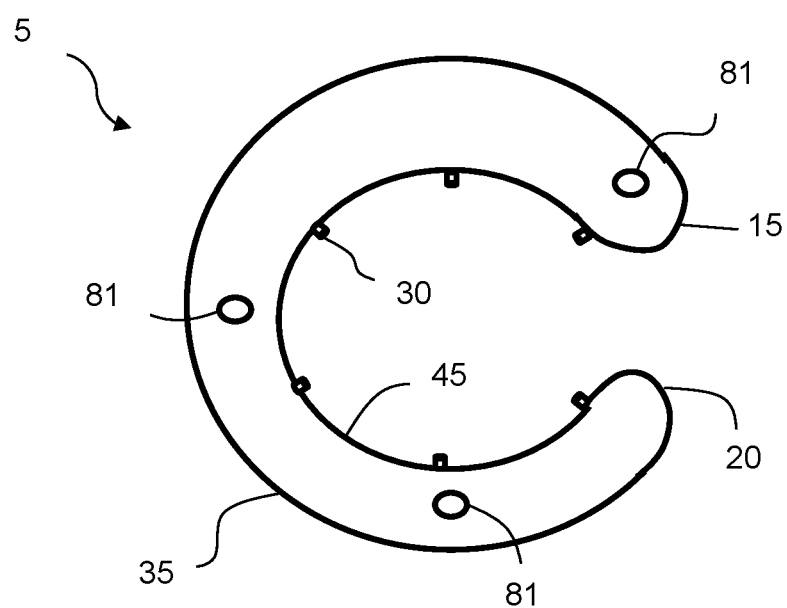
FIG. 10 is a front plan view of a device housing with a plurality of sensors in accordance with some embodiments of the presently disclosed subject matter.

FIGS. 6a and 6b illustrate one embodiment of pump 60 in fluid connection with interior compartment 25 that houses the sanitizing/disinfecting solution. For example, after a preset delay time and/or detecting a sensor/user input, microcontroller 61 (which can be powered by a power source (e.g., battery 110 or bank of batteries 111) commands a transfer pump 60 (and/or a valve) to operate, thereby delivering the disinfecting/sanitizing solution to an ultrasonic transducer or other atomizing device. The fluid thus travels from the internal reservoir compartment to the transducer 112 via a pump and/or valve and the use of tubing. The ultrasonic transducer 112 (or atomizer) can be activated by a microcontroller before, during, and/or after receiving the solution, atomizing the solution. In some embodiments, the transducer can have its own printed circuit board.

The device of FIGS. 6a and 6b thus include housing 10 that protects the device and keeps the components hidden from view and tampering. The device includes one or more fans 113 that are activated by the microcontroller before, during, and/or after the solution is atomized. The fans function to move air through the interior of the device via a network of ducts or other air-directing geometry or passages. Each fan is positioned adjacent to an opening in the housing, thereby drawing air into the housing interior from the surrounding environment. The air moves around and past the ultrasonic transducer, combining with and carrying away the atomized disinfectant solution. The air (combined with and carrying the atomized solution) exits the device through outlets 30 which can be in the form of one or more aperture(s).

Alternatively, the air can exit via a network 114 of apertures, as shown in Ha 6c. The network includes a plurality of apertures that each allow a volume of the atomized solution to exit the device. The network advantageous allows for a wide spray of solution to be dispersed. The outlet apertures direct the combined air/solution towards a desired surface (e.g., doorknob, door handle). Thus, the disinfection/sanitizing solution is applied to the object to be disinfected or sanitized. In some embodiments, the network includes a plurality of apertures that allow the atomized solution to exit the device. In other embodiments, the network can include tubing or other elements to direct the flow of atomized solution to the outlets.

FIGS. 6*d* and 6*e* are side views of the device, with and without housing 220 partially removed to show the components.

Pump 60 can be powered by any known energy source 70. For example, the pump can be operably connected to a battery 110, power cord, and/or power supply in some embodiments. The pump can be connected to the outlets such that when the pump is energized, it will move the disinfecting/sterilizing solution through the outlets to contact handle 25 and/or the surrounding area. Thus, tubing can be used in some embodiments.

The pump and battery can be directly positioned within the interior or exterior of the housing of the housing. Alternatively, the pump and/or battery can be configured within a separate compartment 75 to reduce contact with disinfecting/sanitizing solution 65 and to minimize the chance of damage, as shown in FIG. 7.

Housing 10 can include any suitable number of outlets 30, such as about 1-10 (e.g., at least/no more than about 1, 2, 3, 4, 5, 6, 7, 8, 9, or 10). In the case of outlet network 114, additional outlets (e.g., apertures) can be included, such as 10-1000 or more (e.g., at least/no more than about 10, 100, 200, 300, 400, 500, 600, 700, 800, 900, or 1000). However, it should be appreciated that the device can include any number of outlets. The outlets can all be of the same type and/or size (e.g., nozzles, apertures) or can include a variety positioned at various locations around the housing. For example, it may be desirable to place larger outlets at the top and bottom portions of the device to contact the most used areas of a corresponding door handle.

The device housing further includes port 55 that allows disinfecting and/or sterilizing fluid to be added or removed from interior compartment 25. For example, if the solution runs low, a user can refill the fluid by adding a predetermined amount via the port. Alternatively, if a user decides to replace a first sterilizing solution with a different solution, the first solution can be removed via port 55 and the new solution then added. One embodiment of port 55 is illustrated in FIG. 8. Port 55 can have any desired configuration that allows movement of fluid into or out of the interior compartment. For example, the port can include a screw cap, flip cap, one way valve, two-way valve, check valve, and the like.

Port 55 can be positioned on any exterior surface of housing 10. For example, the port can be positioned on an upper (e.g., top) surface of the device when configured around a doorknob. In this way, inadvertent drips and spills are avoided.

Optionally, device 5 can include one or more indicators 80 that give a visual indication of whether the handle has been sterilized or disinfected, as shown in FIG. 9. For example, the illumination of first indicator 80*a* (e.g., a green light) can communicate to users that the doorknob has been sterilized or disinfected. Optionally, the device can also include second indicator 80*b* (e.g., a red light) that illuminates when the handle has not been sterilized prior to use. The device can further include third indicator 80*c* (e.g., a yellow light) that communicates to users that the outlets will soon dispense disinfection solution on the door handle. Thus, the indicators can be used to designate the level of cleanliness of the handle. It should be appreciated that indicators 80 are not limited to colored lights, and in some embodiments, the lights can all be a single color, flashing light, or series of sounds.

Indicators 80 can be positioned at any location on housing 10. In some embodiments, the indicators can be clustered as shown in FIG. 9. However, the indicators can be dispersed anywhere along housing 10 as desired by the user and/or manufacturer to signify a condition of the device.

The indicators can communicate any of a wide variety of control and/or status information to the user. For example, indicators 80 can provide information related to the length of time since the last sterilizing/disinfecting treatment, the number of users that have touched the door handle, whether the handle is safe to use, whether the handle is actively being disinfected, etc.

The device housing can further include one or more sensors 81 configured to detect when a user's hand is on or directly adjacent to door handle 30. For example, when the sensors are triggered, the outlets can shift to a closed position where they will not spray solution. As shown in FIG. 10, the sensors can be positioned on any area of the housing, such as (but not limited to) inner edge 45, outer edge 35, top face, bottom face, etc. Each sensor can be any element that can detect motion of the surrounding environment. Any type of sensor can be used. For example, sensors that detect heat (e.g., body heat), noise (e.g., the opening of a door), motion (e.g., movement of the door opening), and the like can be used. The term "sensor" therefore includes any element that receives a signal or stimulus (heat, pressure, light, motion, sound, humidity, etc.) and responds to ft.

Housing 10 can be constructed from any suitable material, such as (but not limited to) plastic, metal (e.g., aluminium, stainless steel, copper), ceramics, and the like. In some embodiments, interior compartment 25 can include a coating to protect the housing from degradation from solution 65. The coating can include any non-reactive material, such as stainless steel, glass, and the like. Further, while housing 10 can be constructed in any desired color or pattern, in some embodiments it is configured from a transparent material that allows users to visualize how much solution remains within the interior compartment.

Housing 10 can have any desired length, width, and/or thickness. For example, the device can have a length and/or width of about 1-20 inches (e.g., at least/no more than about 1, 2, 3, 4, 5, 6, 7, 8, 9, 10, 11, 12, 13, 14, 15, 16, 17, 18, 19, or 20 inches). The term "length" refers to the longest horizontal distance of the device. The term "width" refers to the longest vertical distance of the device. The disclosed device can also include a thickness of about 1-5 inches (e.g., at least/no more than about 1, 1.5, 2, 2.5, 3, 3.5, 4, 4.5, 5 inches). The term "thickness" refers to the longest distance that that is perpendicular to both the length and width. However, it should be appreciated that the length, width, and thickness of device 5 is not limited and can be configured outside the ranges given herein.

Housing 10 can have any desired cross-sectional shape, such as rectangular, square, rounded, abstract and the like. Thus, the shape of the housing is not limited to the circular, rectangular, square, or semi-circular design of the figures. Rather, any desired shape or configuration can be used.

The disclosed housing can be constructed using any conventional method. For example, the housing can be formed via thermoforming, welding, and the like, as would be well known in the art.

In use, a desired sterilizing or disinfecting solution can be added to interior compartment 25 of the housing, such as through port 55, as shown in FIG. 11a. Specifically, solution 65 can be added from a larger container 66. After the interior compartment has been filled to a desired level, the port can then be closed to maintain the solution therein, as shown in FIG. 11b. The device can then be configured around or adjacent to a doorhandle as shown in FIG. 11c. Specifically, the device can be inserted or removed from a door handle by inserting the door handle through central opening 40. The door handle is not limited and can include conventional lever designs extending from a door. Alternatively, the door handle can be configured as a circular, cylindrical, or spherical knob or lever.

At a desired time, the device outlets are activated such that a sterilizing and/or disinfecting solution is dispensed onto doorknob 35, as shown in FIG. 11d. The solution can be sprayed for a desired amount of time, such as about 5-30 seconds or more. As a result, harmful microorganisms present on doorknob 35 can be inactivated and/or killed. Particularly, the harmful microorganisms can include (but are not limited to) bacteria (e.g., *E. coli*, septicaemia, tetanus, pneumonia, impetigo, tonsillitis, strep, *legionella, staphylococcus, streptococcus, clostridium*, and the like), viruses (e.g., coronavirus, influenza, Ebola, Marburg, rabies, HIV, and the like), molds (*aspergillus, Trichoderma, Bipolaris, Chaetomium, Geotrichum, Alternaria, Penicillum, Memnoniella, Stachybotrys*, and the like), fungi (Aspergillosis, Blastomycosis, Candidiasis, and the like), and combinations thereof. In some embodiments, about 50-100% of the microorganisms are killed or neutralized (e.g., at least about 50, 55, 60, 65, 70, 75, 80, 85, 90, 95, 99, 99.9, or 100 percent).

Device 5 is capable of dispensing solution 65 as desired by the user. For example, outlets 30 can dispense a sterilizing/disinfecting solution at certain given intervals in time (e.g., every 0.5, 1, 2, 5, or 10 minutes) using a time switch, clock control, and the like. Alternatively or in addition, the outlets can be triggered in response to manipulation of the door handle 35, such as after each individual manipulation or following a given series of such manipulations (e.g., after each use or after a certain number of uses). In the latter case, a counter can initiate the release of solution 65 when a predetermined count is reached.

In some embodiments, one or more sensors 81 detect the presence of a user (e.g., motion sensor, heat sensor, etc.) such that the outlets are triggered before and/or after use. Thus, sensors 81 are effective to detect in real time whether the handle is currently being manipulated by a human hand. In some embodiments, the sensor is a motion detector positioned to continuously scan handle 35. When a user touches the door handle, the hand breaks the sensing beam and the sensor can send a signal to a controller. In other embodiments, the sensors can detect the presence of a hand via motion, temperature change, heat, and the like.

Sensors 81 can be electrically powered and can receive power from the same battery used to power pump 60. The sensors are also in electrical contact with the pump through the device controller. The controller can have a time delay circuit such that when the device detects manipulation of the handle by a hand, triggers the pump after a set period of time (e.g., 1-5 seconds). Such an arrangement allows a hand to be removed from a door handle before the spraying of solution 65 begins.

Figure 12A:
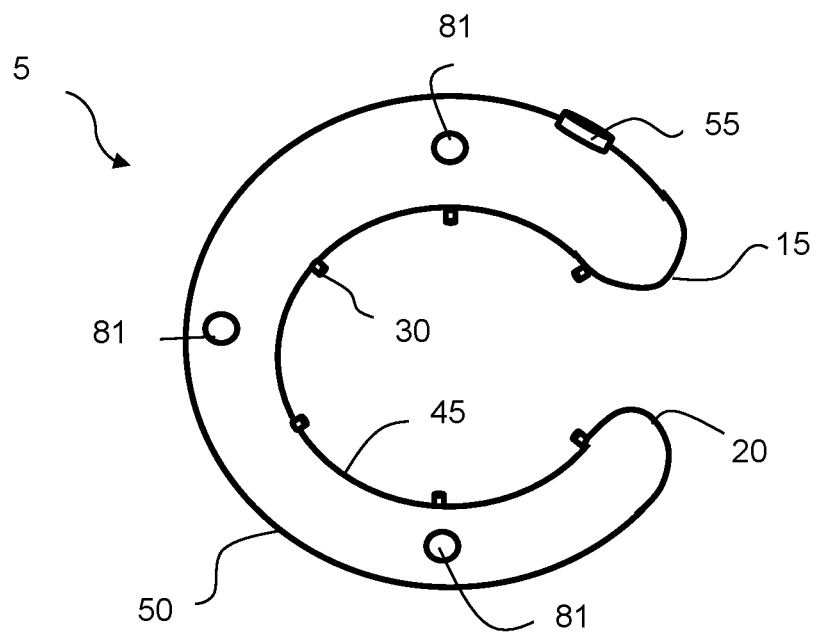
FIG. 12a is a front plan view of a device comprising a plurality of sensors in accordance with some embodiments of the presently disclosed subject matter.

Thus, device 10 includes controller 95 that regulates the timing of the disinfecting sprays from outlets 30. The controller receives signals from device sensors 81 and then switches power on and off to energize and de-energize the pump such that appropriate disinfectant or sterilizing solution is sprayed onto the handle, as shown in FIG. 12a. It is contemplated that the controller includes a digital electronic processor unit programmed to accomplish the functions of the device. The control program can be tuned to optimize disinfecting in any situation by loading control parameters through software. For example, the duration of the spray should be long enough to adequately disinfect the handle. However, the spray should be as short as possible to conserve the inventory of disinfectant in the housing and to permit the handle to dry quickly. Typically, the disinfecting spray can be from about 0.5 to about 10 seconds. The time delay between the time that the sensor detects operation of the door handle and when the disinfecting spray starts can also be varied by loading the time delay value into the controller program through software.

In some embodiments, controller 95 can be configured to provide a maintenance spray at a preset, fixed amount of time after the most recent previous spray. This ensures that the surface of handle 35 is always adequately treated with disinfecting agent. Thus, every time that a handle-triggered spray occurs, the maintenance spray time delay can be reset to the fixed amount of time. If no motion-triggered spray occurs, there can be a maintenance spray after each occurrence of the preset amount of time. The maintenance spray interval can be from about 30 minutes to about 4 hours and the value can be loaded into the controller program through software.

The controller can also be programmed with a clock and calendar function to automatically de-activate the disinfecting spray feature for blocks of time (e.g., hours when the door is out of service, such as closed hours, weekends, holidays, and the like). It is also contemplated that the control system for device 5 can include an optional battery reserve power sensor and indicator to provide an external signal that the battery should be replaced. The device can optionally have a solution inventory sensor and external indicator to alert that the disinfecting and/or sanitizing solution level is low and should be replenished.

Figure 12B:
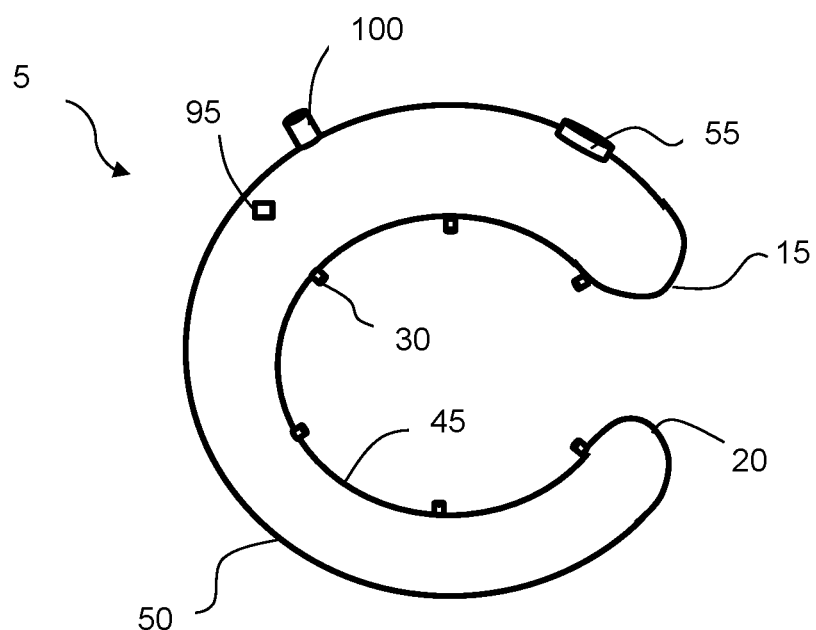
FIG. 12b is a front plan view of a device comprising a reset and controller in accordance with some embodiments of the presently disclosed subject matter.

In some embodiments, the device can include reset 100 that allows the user to manually trigger the outlets to dispense solution 65 onto the door handle. The reset can be configured as a button or other manipulable switch, as shown in FIG. 12b. Thus, the user can actuate the reset to automatically begin a sterilizing or disinfecting cycle where solution 65 is dispensed onto the handle.

In some embodiments, the device can include an activator (e.g., a timer or sensors) that initiate atomization of disinfectant or sanitizing agent from the interior compartment of the device. In some embodiments, an ultrasonic transducer can be used. The disinfecting/sanitizing mist is then blown onto a desired surface (e.g., doorknob) using fans or other air-directing units, as described above. The term "ultrasonic" refers to an operating frequency in excess of about 20,000 Hertz. The term "transducer" refers to a device that converts a non-electrical parameter (e.g., sound, pressure, light) into electrical signals or vice versa. Stated another way, a transducer converts energy of one form into energy of another form.

Figure 13:
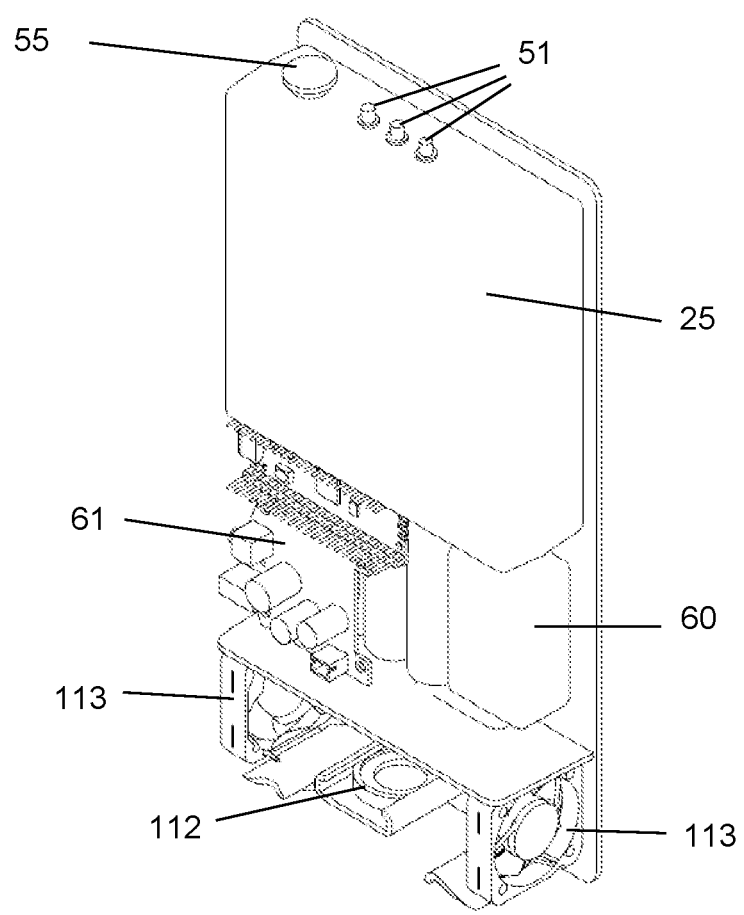
FIG. 13 is a perspective view of a disinfecting or sanitizing device with the housing at least partially removed in accordance with some embodiments of the presently disclosed subject matter.

As shown in FIG. 13, the housing also includes interfaces 51 accessible from the exterior surface of the device, allowing users to interact with the microcontroller to configure any of a variety of settings, such as (but not limited to) delay timers, duration timers, sensors, and the like.

The disclosed device offers many benefits over prior art methods of cleaning door handles and other similar devices. Particularly, device 5 is hands-free, which promotes cleanliness and slows the spread of harmful microbes.

The device quickly and efficiently sanitizes and/or disinfects a corresponding doorhandle, making it safe to use to enter or exit a room.

The device is suitable for a wide variety of environments, including (but not limited to) the home, public restrooms, hospitals, schools, restaurants, stores, airports, doctor's offices, and the like.

Advantageously, device 5 minimizes the spread of infection and disease through the disinfection and/or sterilization of door handle 35.

The disclosed device further ensures compliance with hygiene standards, such as in a hospital or other health care facility.

The disclosed device is easy to use and install, such that even children and the elderly can use and enjoy it.

Device 5 promotes good health by reducing the incidence of transmission of harmful microbes between users. In this way, lives can be saved, and the spread of viruses can be slowed or eliminated.

The device further offers peace of mind for users that they can safely and freely use door handles without fear of spreading microbes.

As described above, although a preferred embodiment of the present invention has been described for illustrative purposes, those skilled in the art will appreciate that various modifications, additions, and substitutions are possible, without departing from the scope and spirit of the invention as disclosed in the accompanying claims.

What is claimed is:

1. A sterilizing or disinfecting dispenser comprising:
   a semi-circular housing defined by an interior compartment, a central opening, and a break in the housing sized to receive a door handle; and
   a plurality of outlets disposed along the interior compartment and oriented toward the central opening such that when the housing is positioned around the door handle, the outlets direct disinfecting material toward the handle;
   one or more sensors;
   an ultrasonic transducer positioned within the interior compartment;
   a pump operably connected to the interior compartment and the ultrasonic transducer;
   a microcontroller configured to activate the outlets to dispense the disinfecting material towards the doorknob.

2. The dispenser of claim 1, wherein the disinfecting or sterilizing solution is selected from hydrogen peroxide, chlorine bleach, alcohol, acid, or combinations thereof.

3. The dispenser of claim 1, wherein the one or more outlets are selected from one or more sprayers, openings, ports, nozzles, or combinations thereof.

4. The dispenser of claim 1, further comprising a port that provides access to the interior compartment of the housing.

5. The dispenser of claim 1, wherein the one or more sensors that trigger when a user approaches the device.

6. The dispenser of claim 1, further comprising a manual reset that triggers activation of the one or more outlets.

7. A method of disinfecting or sterilizing a door handle, the method comprising:
   positioning the dispenser of claim 1 adjacent to an exterior surface of the door handle such as the central opening is positioned partially around the door handle;
   activating the one or more outlets to dispense the disinfecting or sterilizing solution from the interior compartment to contact the door handle after the occurrence of a predetermined event;
   whereby the door handle is disinfected or sterilized.

8. The method of claim 7, wherein the disinfecting or sterilizing solution is sprayed from the outlets for about 5-30 seconds.

9. The method of claim 7, wherein microorganisms present on the door handle are inactivated or killed.

10. The method of claim 9, wherein the microorganisms are selected from bacteria, viruses, molds, or combinations thereof.

11. The method of claim 9, wherein the microorganisms are selected from influenza or COVID-19 viruses.

12. The method of claim 9, wherein the activating occurs at a given time interval.

13. The method of claim 9, wherein the activating occurs in response to manipulation of the door handle.

14. The method of claim 9, wherein the activating occurs in response to input from one or more sensors positioned on the device housing.

15. The method of claim 14, wherein the sensors are selected from motion sensors, temperature sensors, noise sensors, or heat sensors.

16. The method of claim 9, the wherein the disinfecting or sterilizing solution is selected from hydrogen peroxide, chlorine bleach, alcohol, acid, or combinations thereof.

17. The method of claim 9, wherein the device includes a controller that provides maintenance spray from the outlets at a pre-set time interval.

18. The method of claim 9, wherein the activating is in response to a manual reset by a user.

* * * * *